Figure 5:
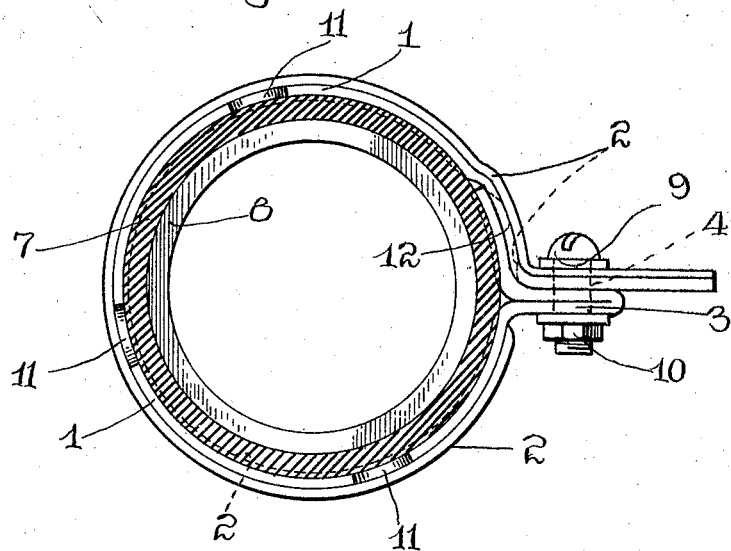

March 8, 1927.
C. S. WITWER
HOSE CLAMP
Original Filed Sept. 26, 1923   2 Sheets-Sheet 1
1,619,841
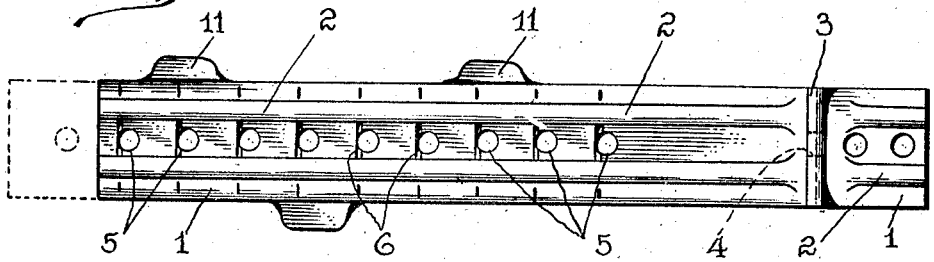
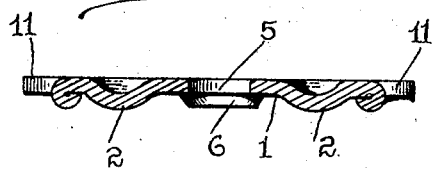 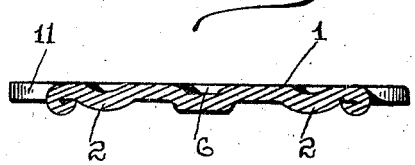
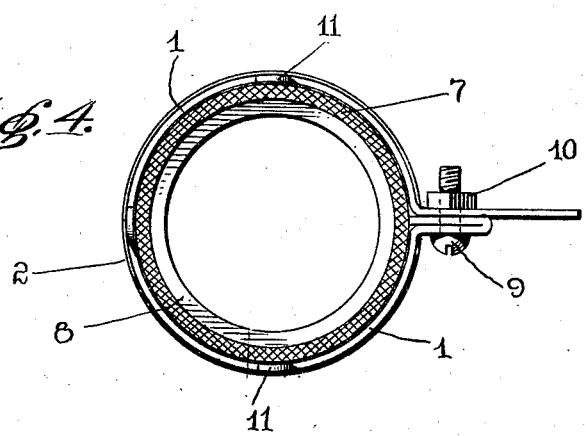
INVENTOR
Charles S. Witwer
BY
Ashley & Ashley
his ATTORNEYS March 8, 1927.

C. S. WITWER 1,619,841

HOSE CLAMP

Original Filed Sept. 26, 1923   2 Sheets-Sheet 2

INVENTOR
Charles S. Witwer
BY
Ashley & Ashley
his ATTORNEY

Patented Mar. 8, 1927.

1,619,841

UNITED STATES PATENT OFFICE.

CHARLES S. WITWER, OF YONKERS, NEW YORK.

HOSE CLAMP.

Application filed September 26, 1923, Serial No. 664,818. Renewed January 18, 1927.

The invention relates to improvements in hose clamps and has particular reference to an extensible band provided with inter-engaging serrations and fastening means arranged to hermetically seal the hose and connections on reception ends and nipples of radiator and pump connections of motive power generating units and like structures.

The object of the invention is the providing of a hose clamp having formed in its annular body serrations adapted to engage one another when brought into contact over a rubber or other material hose connection and apertures permitting the adjustment of the clamp body to take divers diameters of hose, together with shearing indents forming part of the aperture to permit of the cutting, breaking or severance of the surplus clamp body after its proper adjustment and application to the combination structures in its utility.

In the following is described in connection with the accompanying drawings one embodiment of the invention, the features thereof being more particularly pointed out hereinafter in the claims.

In the drawings Fig. 1 is a plan elevation of the clamp prior to its application in annular form; Fig. 2 is a cross sectional view of said clamp at a point adjacent one of the adjusting apertures therein; Fig. 3 is a cross sectional view of the said clamp at a point adjacent one of said apertures and shearing indents; Fig. 4 is a cross sectional view of a hose end connection and nipple showing the hose clamp as applied thereto; and Fig. 5 is a cross sectional view of the hose clamp illustrating the relative positions of the inter-engaging concave and convex beads on the respective ends thereof.

Similar numerals of reference indicate similar parts throughout the several views.

In the drawings 1 designates a strap or band of spring steel having formed therein annular concave and convex beads 2 extending either the full length thereof or a part of its length, and having also formed therein by bending the body thereof back upon itself a supporting shoulder 3 provided with apertures 4 to receive suitable fastening means.

The central body portion of strap 1 has cut therein a plurality of apertures 5 permitting its adjustment to divers diameters of hose connections, and each aperture 5 thereof has impressed in the body of the band and forming part of said aperture 5 shearing indents 6 for severing the unused portion of the band, or that part thereof that may extend beyond the fastening shoulder 3 when applied to different diameters of hose. The severing or shearing of the unused portion of the band is accomplished by bending the same at the desired point of cutting leaving substantially a clean cut finishing end to said band.

By serrating the transverse surface of the band as shown such serrations or corrugations overlap or engage one another and prevent and obviate any side and sliding movement forward and backward of the band and hermetically seal the hose end on the nipple end of the body of which it forms part. In application the band is drawn taut around the hose 7 binding same tightly upon nipple 8 and its free end brought into contact with shoulder 3 and rigidly and permanently fastened together by means of screw 9 and nut 10. When securely tightened the formation of the clamp 1 forces the flexible body of the hose into the serrations and hermetically seals the same upon nipple 8. Tongues 11 may be formed on clamp body 1 for stripping or severing purposes.

The end of hose clamp band or body 1 extends from the separating shoulder 3 and is forced to conform to the hose end 8 so that said concave beads 2 of the extensible portion of said band or body 1 are arranged to engage and overlap the said end so as to compel the said convex and concave beads thereof to inter-engage at 12 and form at that point in the body structure a perfect sealing means.

By reason of the concave and convex formation of the body of the clamp, the rubber body of the hose structure is forced into and about both of said concave and convex portions thereof to seal the hose-end on the nipple and to prevent its movement thereon in any direction.

The device may be varied in many ways in form and structure without departing from the spirit of the invention.

What I claim and desire to secure by Letters Patent of the United States is:—

1. A device of the character described comprising an adjustable metal band composed of a long and short portion, said long portion being provided with inwardly projecting concave beads and said short portion being provided with outwardly projecting convex beads arranged for inter-engagement when the ends overlap, a supporting shoulder formed therein by bending said body back upon itself, apertures therein permitting the adjustment of said band to varying diameters, and indents adjacent said apertures to permit of the severance therefrom of any projecting portions thereof.

2. A device of the character described comprising an adjustable metal band composed of a long and short portion, said long portion being provided with inwardly projecting concave beads and said short portion being provided with outwardly projecting convex beads arranged for engagement when in contact to force the body of a hose-end therein to seal said hose-end and prevent its movement thereon, apertures cut therein adapted for adjusting said clamp to varying diameters of annular surfaces, a supporting shoulder formed therein by bending said body back upon itself, and indents cut in said clamp band for severing from the main body thereof the overlapping end after adjustment to predetermined sizes of hose bodies.

In testimony whereof, I have signed my name to this specification, this 23rd day of May, 1923.

CHARLES S. WITWER.